Jan. 6, 1959
J. E. FILLINGAME
2,867,150
PHOTOGRAPHIC REPRODUCTION APPARATUS
Filed July 20, 1954
5 Sheets-Sheet 4
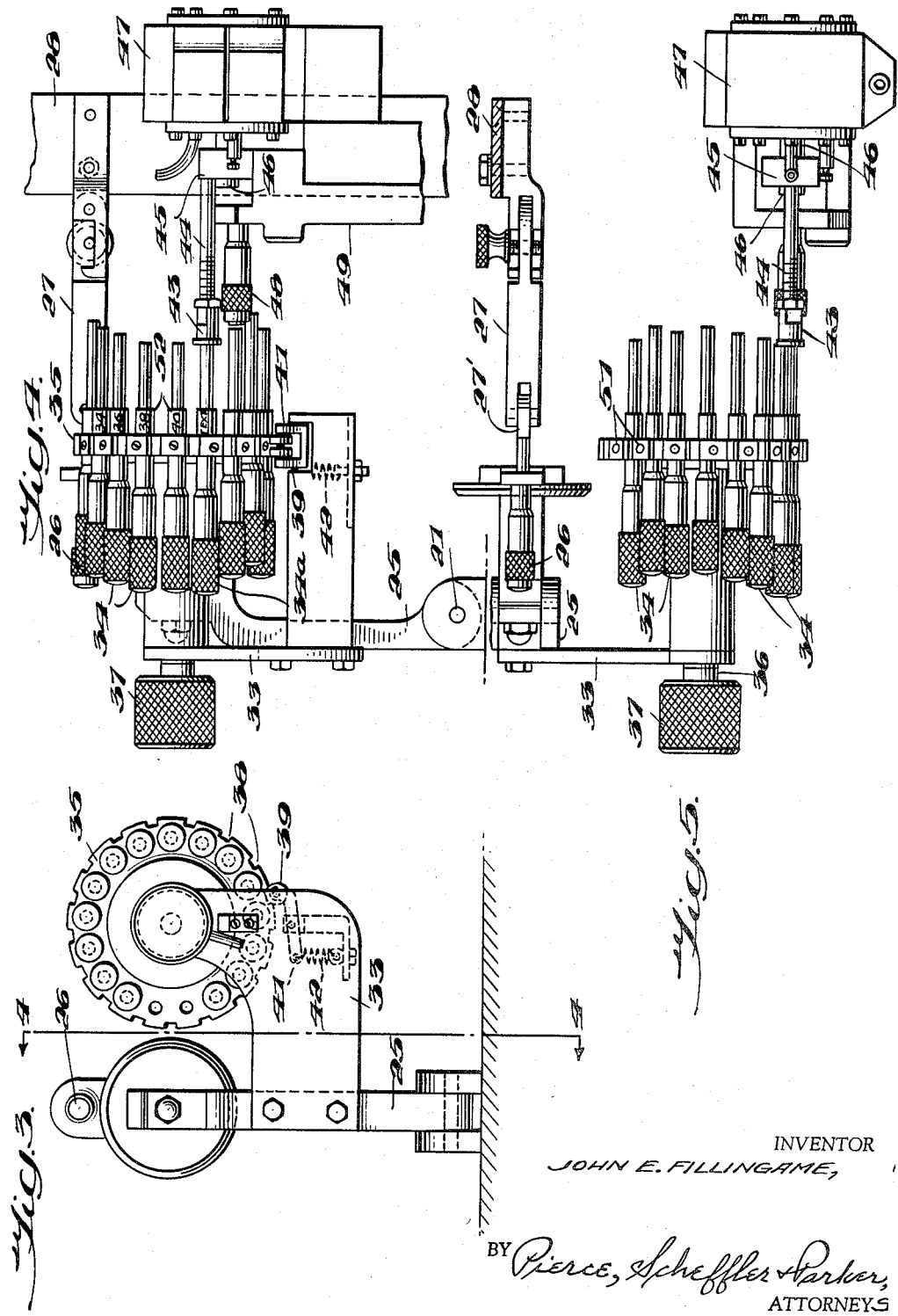
INVENTOR
JOHN E. FILLINGAME,
BY Pierce, Scheffler & Parker,
ATTORNEYS Jan. 6, 1959 J. E. FILLINGAME 2,867,150
PHOTOGRAPHIC REPRODUCTION APPARATUS
Filed July 20, 1954 5 Sheets-Sheet 5
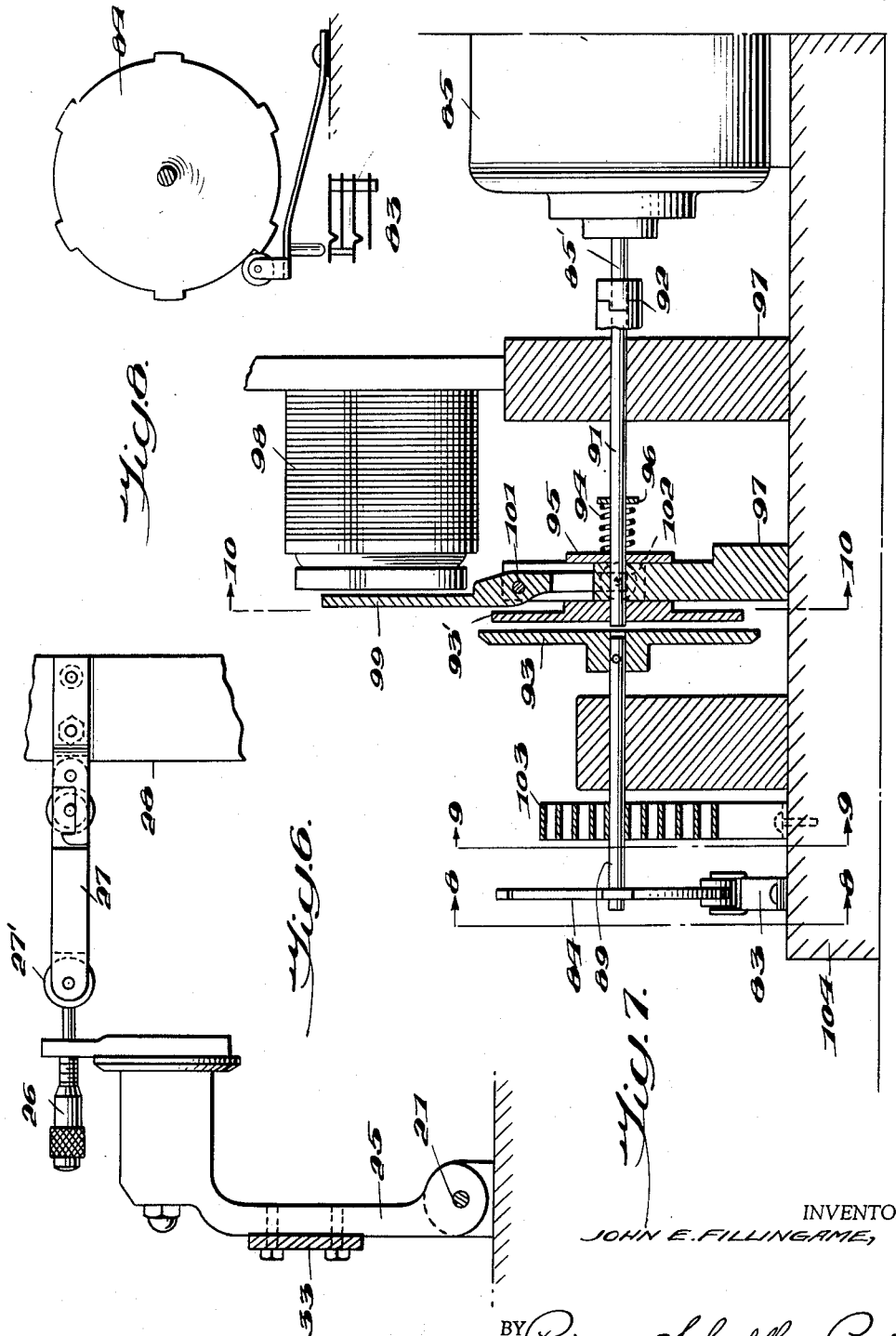
INVENTOR
JOHN E. FILLINGAME,
BY Pierce, Scheffler & Parker,
ATTORNEYS

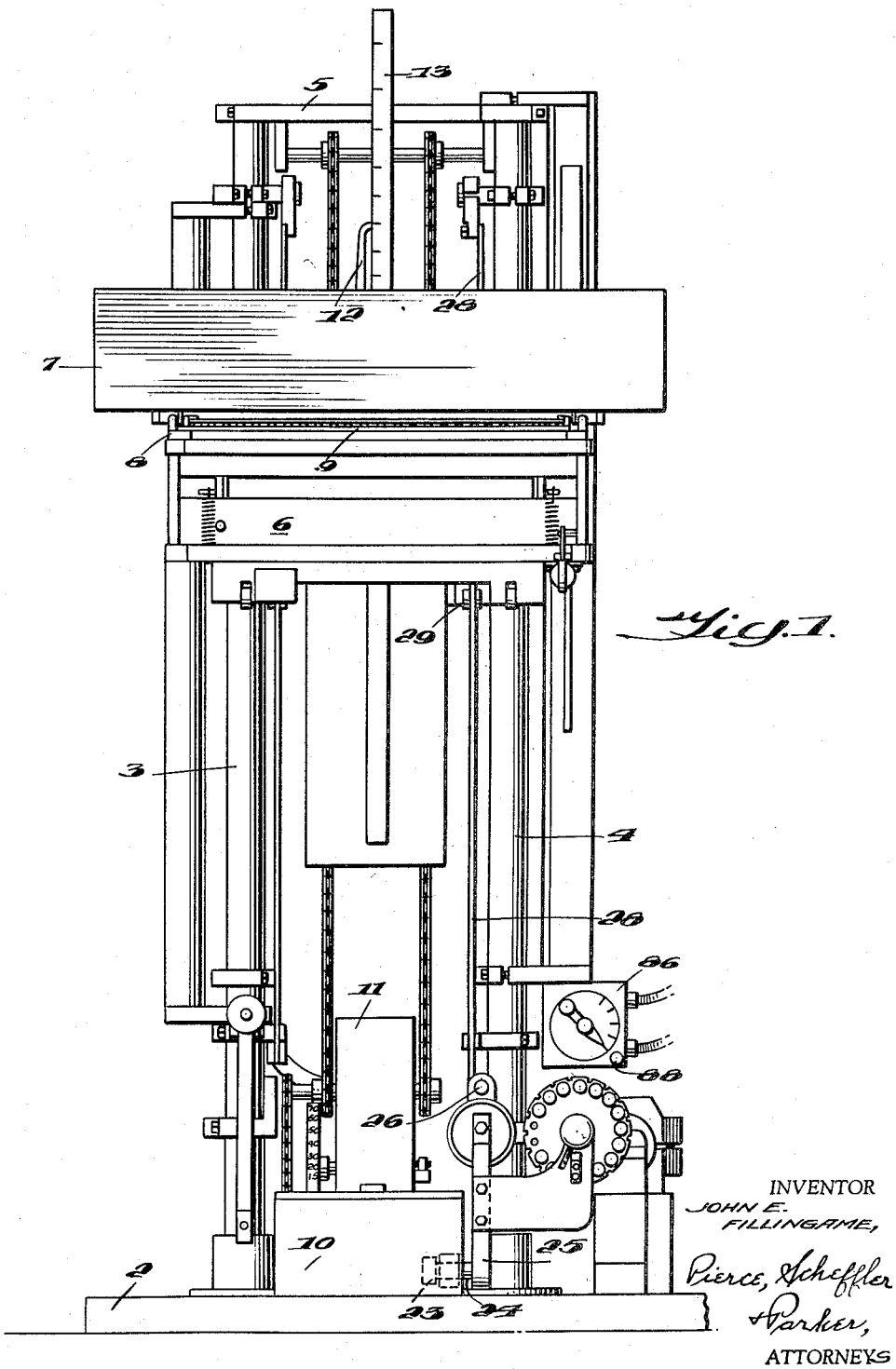

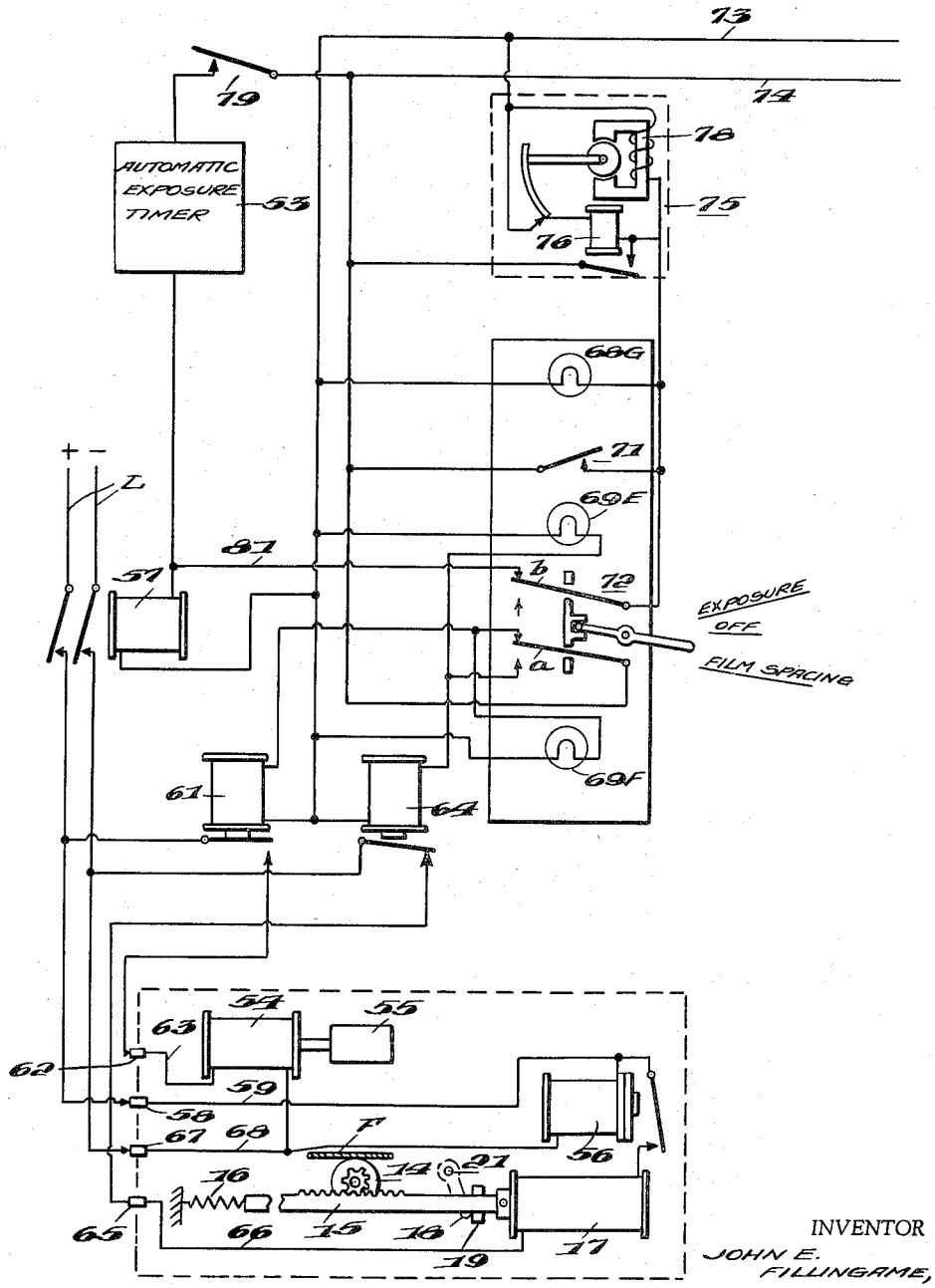

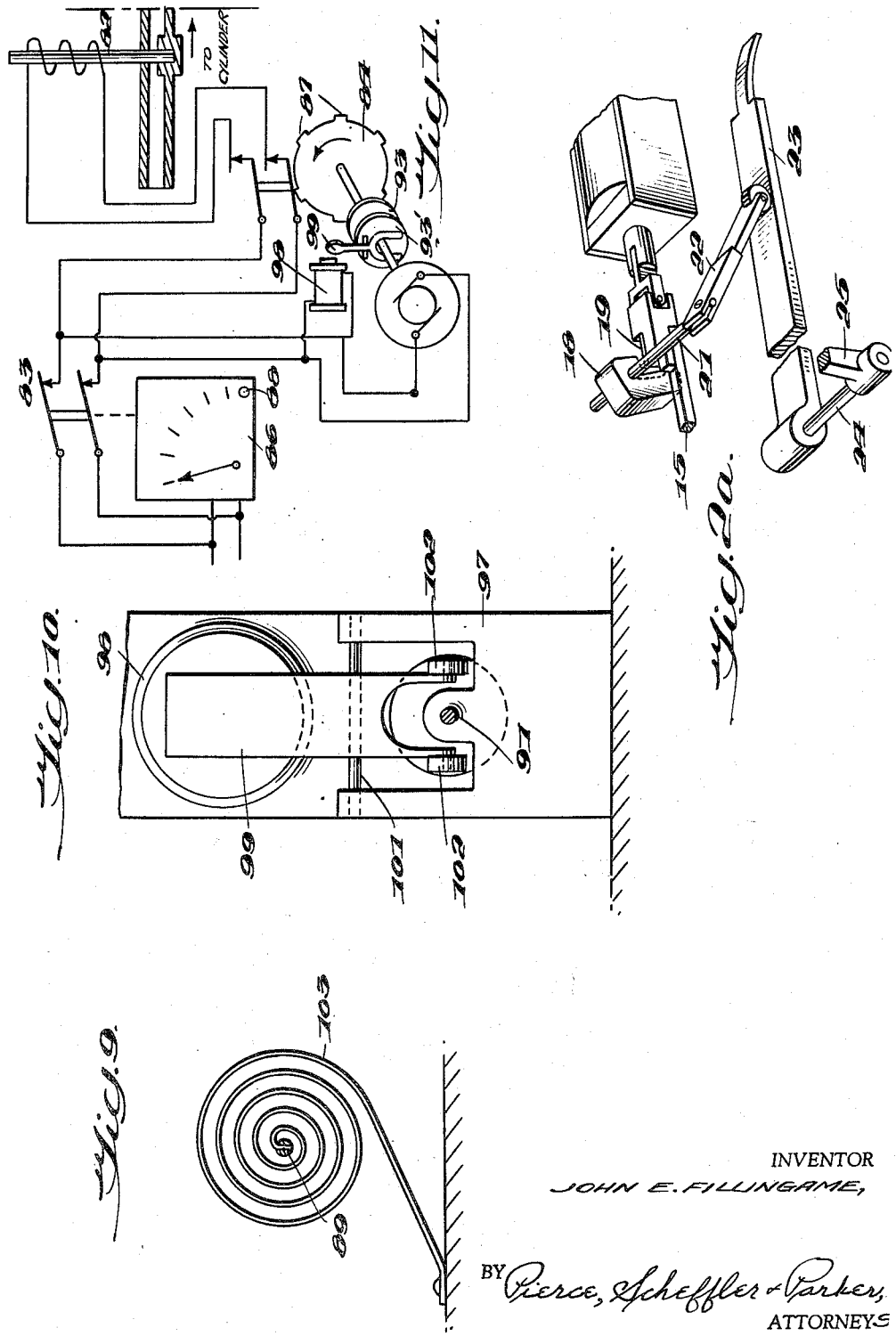

United States Patent Office 2,867,150
Patented Jan. 6, 1959

2,867,150

PHOTOGRAPHIC REPRODUCTION APPARATUS

John E. Fillingame, Washington, D. C., assignor to National Geographic Society, Washington, D. C., a corporation of the District of Columbia Application July 20, 1954, Serial No. 444,498

1 Claim. (Cl. 88—24)

This invention relates to a photographic reproduction apparatus and more particularly to a copying camera of the type in which a plurality of exposures are made in sequence on a single film or photosensitive sheet.

Although not limited thereto, the invention is particularly useful as applied to a camera for preparing material for subsequent photolithographic reproduction; the material being in the nature of separate words such as the names of towns and cities to be applied to a map, the consecutive lines of a story or other text, or a group of lines constituting a title for association with a pamphlet or map.

A photographic composing camera of this character is described and claimed in Patent No. 2,673,487, George Newman Bumstead, and the "copy" or material for reproduction is prepared by arranging separate letter transparencies in composing frames such as described and claimed in Patent No. 2,495,887, to George Newman Bumstead. Such frames are placed in the camera which is adjustable to image the copy in desired size on a film. The material or copy in the individual frames is exposed in succession on the film, and the latter is advanced after each exposure for appropriate spacing of the successive lines.

Objects of the present invention are to provide improved mechanism for the control and adjustment of the film feed in a copying camera of the type in which a series of exposures are made on a film or other photosensitive material, the exposures extending over areas of the same size or of different sizes, as may be desired. An object is to provide a copying camera having a film feed mechanism which may be readily adjusted for the automatic advance of the film after each exposure or for the manual control of the film movement after an exposure. A further object is to provide a camera having a film feed mechanism of the type stated in which the automatic advance of the film may be by a fixed increment or by an increment which varies with the size of the image projected upon the film. Another object is to provide a camera having a film feed mechanism of the type stated in which the parts for the manual control of the film movement include a plurality of stops which may be selectively set for a preselected advance of the film and an electro-pneumatic device for adding one or more minute increments to the preselected advance.

These and other objects and the advantages of the invention will be apparent from the following specification when taken with the accompanying drawings, in which:

Fig. 1 is a front elevation of a copying camera embodying the invention;

Fig. 2 is a schematic diagram of the electrical control circuits and associated shutter and film feed mechanisms;

Fig. 2a is a fragmentary detail of film feed elements on the camera and the film box;

Fig. 3 is a front elevation, on a larger scale, of the control element of the film feeding mechanism of the camera;

Figs. 4 and 5 are a side elevation and a top plan view, respectively, of the same;

Fig. 6 is a fragmentary side elevation of the same as viewed from the side opposite that of the Fig. 3 view;

Fig. 7 is a side elevation, with parts in central section of the mechanism for manually effecting minute increments in the film feed;

Figs. 8, 9 and 10 are a sectional view, an end elevation and a sectional view, respectively, as seen on the planes 7—7, 8—8 and 9—9 of Fig. 7;

Fig. 11 is a diagram of the control circuit for the apparatus shown in Figs. 7 to 10 inclusive.

In Fig. 1 of the drawings, the reference numeral 2 identifies a rigid camera base supporting a rugged framework comprising two vertically extending standards or guide tracks 3, 4 preferably of circular transverse cross-section, and a cross bar 5 connecting the tops of the standards. A carriage, identified generally by numeral 6, is slidably mounted on the standards 3, 4 for vertical travel and carries a light box 7 and a saddle 8 on which a composing frame 9, as described in G. N. Bumstead Patent No. 2,495,887, may be positioned.

A light-tight chamber 10 on the base 2 has an opening in its upper wall which is rendered light-tight by a cylindrical sleeve or lens mount 11 that surrounds and extends upwardly from the opening. The carriage 6 of the illustrated camera may be adjusted vertically to vary the size of the reproduced image in desired manner, for example from 15% to 70% of the size of the transparency on the composing frame 9, and the particular ratio of reproduction is indicated by the position of a pointer 12, fixed to the carriage 6, with respect to a graduated scale on a bar 13 secured to the stationary camera framework.

The camera as shown in Fig. 1 includes means for automatically focusing the image upon a film within the chamber 10 as the carriage 6 is adjusted vertically to control the size of the reproduced image and for automatically controlling the exposure time in accordance with the image size but the details of these mechanisms and the motor means for carriage adjustment form no part of the present invention and will not be described herein. The constructions may be and preferably are substantially identical with those described in the Bumstead Patent 2,673,487 and reference is made to that patent for a description of the complete camera.

As described therein, the camera is arranged in front of a dark room, and the film or other medium to be exposed is supported within a box which is moved by a motor, not shown, from the dark room into the light-tight chamber 10 of the camera, and returned to the dark room when several exposures of the film are completed. The film box is provided with an electrically operated shutter and with mechanism for advancing the film after each exposure, and is preferably of the construction shown and claimed in my copending application Ser. No. 426,446, filed April 29, 1954, now U. S. Patent No. 2,781,690 granted February 19, 1957, but for convenience of illustration and description is here shown schematically in Fig. 2 as of the construction illustrated in detail in Figs. 5 and 9 of Bumstead Patent No. 2,555,631. The sheet F of film or other photo-sensitive material passes over and is held in frictional engagement with a main feed roll 14 which is turned clockwise, by movement of the rack bar 15 to the left by spring 16 when solenoid 17 is de-energized, thereby feeding the sheet F to the right or rear of the box by an increment which is determined by the position of lug 18 with respect to a stop 19 secured to the rack bar 15. The stop lug 18 is secured to a rock shaft 21 which extends to the exterior of the light box and is provided with an arm 22 which rides upon the lever arm 23 of the film feed adjusting mechanism when the film box is moved outwardly into operative position within the chamber 10, see Fig. 2a. The lever arm 23 is secured to a shaft 24 that is journalled on the base 2 and provided with a second arm 25 which carries a microscrew 26 in position to be engaged by roller 27' at the end of a contact arm 27 hinged upon the lower end of a cam lever 28 when the contact arm is in lowered operative position as shown in Fig. 6. The cam lever 28 is hinged upon the upper end of the standard 4 and is automatically adjusted by a roller 29 on the carriage 6 as the latter is moved up and down to vary the size of the image on film F with respect to the stencil supported on the composing frame 9, see Fig. 1.

As described in Bumstead Patent 2,673,487, the advance of the film F after each exposure is varied automatically and in proportion to the size of the reproduced image as the position of stop lug 18 is adjusted by lever arm 23 which is moved by the cam lever 28 through the engagement of its contact arm 27 and roller 27' with the microscrew 26. The solenoid 17 is energized at each exposure but the main feed roll 14 has a one-way clutch connection to the rack bar 15 and does not move when the armature is attracted by solenoid 17. On de-energization of the solenoid 17, the rack bar 15 is moved toward the left by spring 16 but only to the extent permitted by the stop lug 18. This automatic control of the film feed is employed to obtain an adequate spacing between successive exposures of "copy" set on the composing frame 9 when there is to be no definite relationship between the successive compositions, for example when each composed line comprises one or more names to be applied to different geographical features on a map. When the material comprises successive lines of descriptive matter or other text it is preferable to employ a fixed or "text" spacing between successive exposures. For this regular spacing and for a hand or manual control of the spacing after an exposure, a bracket 33 is secured to the lever arm 25 and a plurality of microscrews 34 are mounted in a drum or circular plate 35 which is journalled on a bolt 36 which extends through the bracket 33 and is provided with a clamp nut 37 for locking the drum in a desired position of adjustment. The periphery of the drum or mounting plate 35 is provided with a series of indexing notches 38 for receiving a roller 39 on arm 41 which is urged by spring 42 to seat the roller 39 in a notch 38 and arrest the drum when one of the microscrews 34 is in axial alinement with a relatively stationary stop 43 secured to a rod 44 fixed to a block 45 mounted on piston rod 46 of a piston, not shown, in an air cylinder 47. A microscrew 48 is mounted on the supporting base 49 of the cylinder 47 to serve as a stop for engagement by the block 45, and it is calibrated with precision so that it may be set for the desired film feed, say 0.01 inch, which results from each stroke of the piston in cylinder 47.

The barrels of the microscrews 34 are anchored in the drum or plate 35 by setscrews 51, and the microscrew 34a which is to engage the stop 43 for a uniform, but adjustable spacing between successive exposures, carries the legend "Text." The other microscrews carry legends 52 which indicate the number of hundredths of an inch by which the film is advanced when the individual microscrews are alined with the stop 43. The illustrated camera was provided with fourteen additional microscrews 34 which carried legends 52 of the even numbers "14" to "40" inclusive to indicate the number of hundredths of an inch of film feed effected when the respective microscrews were alined with the stop 43. As a matter of convenience, the barrels of the microscrews 34 are so mounted on the drum 35 that the film feed indicated by the legend 52 of each microscrew is obtained when the microscrew is adjusted to approximately the legend value, but the mounting of the microscrews is not critical as a tabulation may be prepared to show the exact setting for each microscrew to develop the indicated film feed. Similarly a chart or tabulation is prepared of the particular settings of the "Text" microscrew 34a for different values of film advance. The relation of the settings of the microscrew 34a to the resulting film advance depends upon the relative lengths of the several lever arms of linkage for adjusting the stop 17 and upon the mounting of the barrel of the microscrew 34a. In one particular installation, adjustment of the microscrew 34a from 0.01425 to 0.6660 varied the film feed from 0.022 to 0.909 inch, but the linkage may of course be designed for other transmission ratios. For regular or automatic spacing after each exposure, the contact arm 27 is turned down, as shown in Figs. 3 to 6, to seat a roller 27' in the end thereof against the microscrew 26. On moving the carriage 6 up and down to obtain the desired size of the image projected upon the film F, the cam lever 28 is adjusted angularly by the roller 29 and the shaft 24 is thereby rocked to adjust the lever arm 23 and determine the position of the stop lug 18 within the film box. The length of the exposure is controlled automatically by a light integrating circuit 53 which is described in detail in the Bumstead Patent No. 2,673,488, and a solenoid 54 for operating the shutter 55 is de-energized at the completion of the exposure period, see Fig. 2. The solenoid 17 of the film feed mechanism is energized through a relay 56 which pulls in simultaneously with the shutter operating solenoid 54 but which releases after a time delay that allows for a closing of the shutter prior to the release of armature of the film feed solenoid 17. On de-energization of the solenoid 17, the rack bar 15 is moved toward the left by spring 16 and the film F is thereby moved by an increment determined by the relative positions of stop members 18 and 19.

For "Text" spacing, the contact arm 27 is turned upward into inoperative position and the drum 35 is adjusted to aline the "Text" microscrew 34a with the stop 43. The film F is advanced automatically after each exposure, but the particular film feed is determined by the setting of the microscrew 34a and does not vary with the size of the image.

For a hand control of the film feed, the drum 35 is rotated to aline a selected microscrew 34 with the stop 43. This necessarily results in some rocking of the shaft 24 and means must be provided to prevent this manual adjustment from resulting in an inadvertent movement of the film feed roll 14. As shown in Fig. 2, the solenoids within the film box are energized from the leads L, L of a low voltage direct current circuit under the control of a relay 57 which corresponds in general to relay 213 of the aforesaid Bumstead Patent 2,673,487. The +lead L is connected through a spring contact, a terminal plug 58 on the film box, and a lead 59 to the relay 56 within the film box, and is connected through the normally closed contacts of a main shutter relay 61 and a spring contact to a box terminal plug 62 from which lead 63 extends to a solenoid 54 which opens the shutter 55. It is to be understood that the spring contacts, and others to be mentioned, are mounted on a fixed part of the camera in position to be engaged by the terminal plugs on the film box when the latter is moved into forward or operative position beneath the camera lens. The lead —L is connected through a spring contact and a terminal plug 67 on the box to the return lead 68 of the slow-opening relay 56 which has contacts for completing the energizing circuit of the film feed relay 17. When the shutter solenoid 54 and the relay 56 are simultaneously energized, the relay 56 pulls in at once to energize the film feed solenoid 17, but the relay 56 opens only after a time delay when de-energized, thereby to maintain the energization of the film feed solenoid 17 for an interval which permits closing of the shutter 55 before the spring 16 moves the rack bar 15 to advance the film. As distinguished from the energizing network of the film box shown in Bumstead 2,555,631, only one of the solenoids for operating the shutter and the film feed mechanism may be selectively energized in accordance with the energization of the relays 61 and 64. A control panel 68 is arranged at a convenient position with respect to the camera and provided with signal lamps 69G, 69E and 69F, a push button switch 71 and a 3-position double-pole switch 72. A lead 73 from a conventional 115 volt alternating current light and power circuit constitutes a common return for the several signal lamps and for relays 57, 61, and 64, and this lead 73 is connected to one side of the push button switch 71 through a timer 75 of known type which includes a holding relay 76 with contacts in parallel with the push button switch 71 and a timing switch, shown schematically as including an arcuate contact 77 that is driven by a rotor of a small clock motor 78 to open the circuit at the expiration of a selected time interval. The other side of switch 71 is connected to the other power line lead 74.

In the mid-position of switch 72, neither of the relays 61 and 64 is energized and the camera may be operated with automatic or "Text" spacing as both the shutter solenoid 54 and the film feed solenoid 17 are energized through the contacts of relay 57 upon each closure of the push button 79 to start an operation of the automatic exposure timer 53. For individual manual control of the film feed, the switch 72 must be shifted in alternation between the end positions indicated by the legends "Exposure" and "Film Spacing." As illustrated in Fig. 2, the switch 72 is adjusted for film spacing and the lower blade *a* of the switch is moved into engagement with an upper contact to energize the relay 61, thereby opening the connection of lead +L to the shutter solenoid 54. The upper blade *b* of the switch is connected to the power lead 73 through the timer 75 and is in engagement with an upper contact which is connected to relay 57 by a lead 81. It is assumed that an exposure was made previously on the film F when the switch 72 was in its alternative position, with the relay 64 energized to open the circuit to the relay 56 which controls the energization of the film feed solenoid 17. A momentary closure of the switch 71 will energize the timer 75 for a cycle of operation and the relay 57 will remain energized for the pre-selected timing period. The solenoid 17 therefore remains energized during this pre-selected interval which is of sufficient length, for example about 10 seconds, to permit the adjustment of the drum 35 to set the desired microscrew 34 in engagement with the stop 43. The drum 35 and its supporting arm 25 may be moved at will during this preselected interval without producing any movement of the film F since the movement of the armature into the solenoid 17 does not result in any movement of the film feed roller 14 but merely sets the film feed mechanism for actuation by a rack bar 15 and spring 16 upon de-energization of the solenoid 17.

The film feed effected under control of the apparatus so far described may be increased by one or more small increments of a selected amount, say 1/100 inch, by admitting pressure air to the cylinder 47 to displace the stop 43. As shown schematically in Fig. 11, the flow of pressure air to the cylinder 47 is under control of an electromagnetic valve 82. The switch 83 for energizing the valve is actuated by a cam disk 84 which is driven by a small electric motor 85 of clock type, the motor 85 being energized in turn through an electric timing mechanism 86 of conventional type which may be set to run from 1 to 5 seconds. The cam disk 84 is provided with lobes 87 which are so spaced as to close the switch 83 at one second intervals. On setting the timer 86 for say 2 seconds, and depressing its starting button 88, the motor 85 will be energized for a period of two seconds and the cam disk 84 will close the switch 83 twice, thereby twice opening the valve 82 to admit pressure air to the cylinder 47.

The cam disk 84 is not fixed to the shaft 85' of the motor 85 but is carried by a stub shaft 89 which is coupled to shaft 85' through an intermediate shaft 91 having a coupling 92 to motor shaft 85' which permits axial movement of the intermediate shaft 91, and an electrically controlled friction clutch comprising a plate 93 on shaft 89 and a plate 93' on shaft 91. The clutch is normally disengaged by a light spring 94 coiled about shaft 91 and seated between a fixed abutment 95 and a pin or collar 96 secured to the shaft. The intermediate shaft is journalled and slidably supported in bearing blocks 97 and a solenoid 98 is mounted on the blocks for actuating an armature yoke 99 to move the shaft axially, to the left as seen in Fig. 6 to engage the clutch simultaneously with the energization of motor 85 upon closure of the switch 83. The armature yoke or clutch operator 99 is mounted on a block 97 by a pivot rod 101 and its lower end is forked and provided with a roller 102 which engages the clutch plate 93' at opposite sides of the intermediate shaft 91. A spiral spring 103 is connected between the cam shaft 89 to restore the cam shaft to its initial position upon the opening of switch 83 by the timer mechanism 86.

The mechanism for advancing the film by small increments of say 0.01 inch therefore resets immediately after each manual operation of the push button 88 and may be again set for the further advance of the film by a desired number of increments.

The novel features of the variable feed mechanism for the film as disclosed hereinabove are claimed in a divisional application Serial No. 523,253, filed July 20, 1955, and which is now U. S. Patent No. 2,832,591, granted April 29, 1958.

I claim:

In a photographic camera having a spring closed shutter provided with a shutter solenoid for opening the same, and feed mechanism for advancing the film on which exposures are made, said feed mechanism including a feed solenoid for setting a film feed rack in position for movement by a spring upon deenergization of the feed solenoid; a control network including a shutter circuit for energizing said shutter solenoid and a film feed circuit for energizing said feed solenoid, normally open contact means in each of said circuits, a primary relay for closing said normally open contact means, a pair of normally closed contacts in each of said circuits, a main shutter relay controlling the normally closed contacts of the shutter circuit, a main film feed relay controlling the normally closed contacts of the film feed circuit, and control means comprising circuit elements including manually operable switch means for energizing in alternation one or the other of said main relays, thereby selectively to open either the shutter circuit or the film feed circuit and further including a timing switch in series with a push button switch and said primary relay, whereby closure of said push button switch after adjustment of said manually operable switch to energize said main shutter relay will result in energization of said primary relay and said film feed circuit for an interval determined by said timing switch.

References Cited in the file of this patent

UNITED STATES PATENTS

| | | |
|---|---|---|
| 2,099,681 | Draeger | Nov. 23, 1937 |
| 2,364,188 | Bryce | Dec. 5, 1944 |
| 2,496,329 | Briechle | Feb. 7, 1950 |
| 2,616,330 | Westover | Nov. 4, 1952 |
| 2,630,743 | O'Kane | Mar. 10, 1953 |
| 2,673,487 | Bumstead | Mar. 30, 1954 |